US006783244B1

(12) United States Patent
Okuyama et al.

(10) Patent No.: US 6,783,244 B1
(45) Date of Patent: Aug. 31, 2004

(54) DISPLAY APPARATUS

(75) Inventors: Atsushi Okuyama, Saitama (JP); Hiroyuki Kodama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 09/659,686

(22) Filed: Sep. 11, 2000

(30) Foreign Application Priority Data

Sep. 22, 1999 (JP) .......................... 11-268138

(51) Int. Cl.[7] .............................................. G03B 21/00
(52) U.S. Cl. ............................. 353/57; 353/31; 353/84
(58) Field of Search .............................. 353/31, 33, 34, 353/37, 52, 54, 57, 60, 84, 122; 349/5, 7, 8, 18; 359/889, 892

(56) References Cited

U.S. PATENT DOCUMENTS

| | | | | |
|---|---|---|---|---|
| 5,136,397 A | * | 8/1992 | Miyashita | .................... 353/85 |
| 5,161,042 A | | 11/1992 | Hamada | ...................... 359/41 |
| 5,917,561 A | * | 6/1999 | Hatanaka | ....................... 349/8 |
| 5,946,114 A | * | 8/1999 | Loiseaux et al. | ............... 349/5 |
| 6,139,157 A | | 10/2000 | Okuyuma | .................... 353/102 |

FOREIGN PATENT DOCUMENTS

| | | |
|---|---|---|
| JP | 3-056922 | 3/1991 |
| JP | 4-53943 | 2/1992 |
| JP | 4-060538 | 2/1992 |
| JP | 7-72450 | 3/1995 |

* cited by examiner

*Primary Examiner*—William Dowling
(74) *Attorney, Agent, or Firm*—Fitzpatrick, Cella, Harper & Scinto

(57) ABSTRACT

A display apparatus of the type which forms a color image by modulating a plurality of lights different from each other in color by one or more display elements, includes a device for changing the color purity of at least one light by inserting or extracting a wavelength selection element into or out of the optical path of at least one of the plurality of lights, or changing the attitude of the wavelength selection element, and a device for supplying information as to whether the wavelength selection element is in the optical path of the at least one color light or information on the attitude of the wavelength selection element in the optical path of the at least one color light.

18 Claims, 15 Drawing Sheets

DISPLAY APPARATUS

BACKGROUND OF THE INVENTION

1. Field of the Invention

The present invention relates to a display apparatus, such as a projection type display apparatus for displaying computer images, video images, etc. on a large screen.

2. Description of the Related Art

Recently, the purposes of use of projection type display apparatuses for displaying computer images in presentations using computers are diversified, and there is a demand for a projection type display apparatus which provides optimum color purity, color balance, illuminance, etc. according to the purpose of use.

FIG. 8 shows the construction of a conventional projection type display apparatus. In FIG. 8, white light emitted from a light source portion 101 is condensed by a reflector 102, passes through fly-eye lenses 103 and 104, a polarization transformation element 105, and a condenser lens 106. Then, it travels by way of a mirror M1 and is separated into three color lights of R, G and B by dichroic mirrors DM1 and DM2, transmitted through condenser lenses 107G and 107B and a relay lens system 107R, transmitted through dichroic filters DF(G) and DF(R), and transmitted through image display elements 108R, 108G and 108B before the color lights of R, G and B are synthesized into one, the image displayed on the image display elements being projected in an enlarged state onto a screen or the like (not shown) by a projection lens 109.

As the light source, a discharge lamp such as a metal halide lamp or a mercury vapor lamp is used. FIG. 9 shows an example of the spectral distribution of a white light source.

As shown in FIG. 9, generally speaking, a white light source has a continuous intensity distribution in the visible light wavelength range of 400 nm to 700 nm. In a projection type display apparatus as shown in FIG. 8, this white light is separated into color lights of R, G and B in a color separation system. At this time, when light component in the wavelength range of 570 nm to 600 nm is taken in the green color light component, the green is turned into yellow, making it difficult to express the pure green color.

Further, when light component in the wavelength range of 570 nm to 600 nm is taken in the red color light component, the red is turned into orange, making it difficult to express the pure red color. In view of this, in the illumination system of the projection type display apparatus, a dichroic filter, etc. are provided on the incident side of the image display elements in addition to the dichroic mirrors DM1 and DM2 to remove the light of the wavelength range of 570 nm to 600 nm so that the light of the wavelength range of 570 nm to 600 nm may not reach any of the image display elements. FIG. 10 shows the spectral distribution of white light synthesized by a dichroic prism DP when light of the wavelength range of 570 nm to 600 nm is removed.

In the construction of FIG. 8, the spectral transmittances of the dichroic mirrors DM1 and DM2 are shown in FIGS. 11 and 12, and the spectral transmittances of dichroic filters DF(G) and DF(R) when light of the wavelength range of 570 nm to 600 nm is removed by providing the dichroic filters DF(G) and DF(R) are shown in FIGS. 13 and 14. Here, there is a technique in which at least one of the dichroic filters DF(R) and the DF(G) can be inserted and removed into and from the optical path making it also possible to display a color image with no dichroic filter. According to this technique, the dichroic filter is inserted and removed into and from the optical path to thereby vary the purity of the corresponding color to vary the light quantity, whereby it is possible, in a single projection type display apparatus, to select between a color-purity-emphasized (color-reproduction-emphasized) display form (normal mode) and a brightness-emphasized display form.

However, the construction in which the dichroic filter is inserted or removed to thereby vary the purity of the corresponding color to vary the light quantity, has the following problems.

1. When a user of the projection type display apparatus has inserted or removed the dichroic filter into or from the optical path, it is possible for the user to recognize whether the apparatus is in the color-purity-emphasized mode or the brightness-emphasized mode. However, if after this user has inserted or removed the dichroic filter, another user uses the projection type display apparatus to display an image from which it is difficult to recognize whether the apparatus is in the color-purity-emphasized mode or the brightness-emphasized mode, the apparatus might be used in a state not suited for the purpose of use of the other user.

2. When the dichroic filter is removed from the optical path (when it is on standby outside the optical path), the quantity of light impinging upon the image display elements is larger than when the dichroic filter is in the optical path, so that the amount of heat generated at the polarizing plates provided in front of and behind the image display elements also substantially increases, with the result that the temperature in the vicinity of the image display elements rises, thereby adversely affecting the characteristics of the image display elements and the polarizing plates.

SUMMARY OF THE INVENTION

Accordingly, it is an object of the present invention to provide a display apparatus capable of solving the above problems 1 and 2 separately or simultaneously.

In a first aspect of the present invention, there is provided a display apparatus of the type which forms a color image by modulating a plurality of lights different from each other in color, by one or more display elements. The display apparatus comprising means for obtaining a plurality of different display forms by changing the color purity of at least one of the plurality of lights, and means for supplying information on the display forms.

In a second aspect of the present invention, there is provided a display apparatus of the type which forms a color image by modulating a plurality of lights, different from each other in color, by one or more display elements. The display apparatus comprising means for changing the color purity of at least one of said plurality of lights by inserting or extracting a wavelength selection element into or out of the optical path of at least one of said plurality of lights or changing the attitude of the wavelength selection element, and means for supplying information as to whether the wavelength selection element is in the optical path of the at least one of the plurality of lights or information on the attitude of the wavelength selection element in the optical path of the at least one of the plurality of lights.

In a third aspect of the present invention, there is provided a display apparatus, wherein said means for supplying information includes a display means formed by an LED, a liquid crystal device, etc.

In a fourth aspect of the present invention, there is provided a display apparatus of the type which forms an image by modulating light by one or a plurality of display elements, said display apparatus comprising cooling means for cooling the display elements, the cooling means being capable of varying its cooling capacity according to variation in the display form of the image.

In a fifth aspect of the present invention, there is provided a display apparatus of the type which forms an image by modulating light by one or more display elements, with the display apparatus comprising cooling means for cooling the display elements and means for varying the quantity of light impinging on the one or more display elements. The cooling capacity of the cooling means with respect to the one or more display elements is varied according to variation in the quantity of light.

In a sixth aspect of the present invention, there is provided a display apparatus of the type which forms a color image by modulating a plurality of lights, different from each other in color, by one or more display elements. The display apparatus comprises cooling means for cooling the display elements and means for obtaining a plurality of display forms by changing the color purity of at least one light of the plurality of lights, wherein the cooling capacity of the cooling means is varied with respect to the display elements modulating said at least one of said plurality of lights according to variation in the color purity of at least one of said plurality of lights.

In a seventh aspect of the present invention, there is provided a display apparatus of the type which forms a color image by modulating a plurality of lights different from each other in color by one or a plurality of display elements. The display apparatus comprises cooling means for cooling the display elements and means for varying the color purity of at least one light of the plurality of lights by inserting or removing a wavelength selection element into or from the optical path of the at least one light or varying the attitude of the wavelength selection element. The cooling capacity of the cooling means with respect to the display elements modulating said at least one light is varied according to whether the wavelength selection element is in the optical path of said at least one light or not or according to variation in the attitude of the wavelength selection element in the optical path of said at least one light.

In an eighth aspect of the present invention, there is provided a display apparatus wherein the cooling means is an air cooling type cooling means, the variation in the cooling capacity being variation in air flow rate with respect to the display element.

In a ninth aspect of the present invention, there is provided a display apparatus wherein the cooling means is a water cooling type cooling means, the variation in the cooling capacity being variation in flow rate with respect to the display element.

In a tenth aspect of the present invention, there is provided a display apparatus of the type which forms a color image by modulating a plurality of lights, different from each other in color, by one or more display elements. The display apparatus comprises air-cooling means for air-cooling the display elements, means for varying the color purity of at least one light of the plurality of lights by inserting or removing a wavelength selection element into or from the optical path of the at least one light or varying the attitude of the wavelength selection element, and means for supplying information on the position or the attitude of the wavelength selection element with respect to the optical path of the at least one light. The air flow rate of the air-cooling means is varied with respect to the display elements modulating the at least one light according to whether the wavelength selection element is in the optical path of the at least one light or not or according to the attitude of the wavelength selection element in the optical path of the at least one light.

In an eleventh aspect of the present invention, there is provided a display apparatus wherein said means for supplying information is provided with means for detecting that the wavelength selection element is in the optical path of said at least one light or that it is in a predetermined attitude and for lighting a lamp.

In a twelfth aspect of the present invention, there is provided a display apparatus wherein the wavelength selection element is an element which transmits visible light of a wavelength longer than a predetermined wavelength and blocks visible light of a wavelength shorter than that or an element which transmits visible light of a wavelength shorter than a predetermined wavelength and blocks visible light of a wavelength longer than that.

In a thirteenth aspect of the present invention, there is provided a display apparatus wherein the wavelength selection element is an edge filter, a band pass filter or a band cut filter.

In a fourteenth aspect of the present invention, there is provided a display apparatus comprising a plurality of dichroic mirrors separating white light from a light source into the plurality of lights of different colors consisting of red, green and blue lights.

In a fifteenth aspect of the present invention, there is provided a display apparatus wherein the display elements are arranged in correspondence with the red, green and blue lights, and wherein there are provided a plurality of dichroic mirrors for synthesizing image light from a plurality of display elements modulating the red, green and blue lights.

In a sixteenth aspect of the present invention, there is provided a display apparatus wherein the display elements include three pixel groups, respectively corresponding to the red, green and blue lights, and micro lens arrays condensing lights of the colors corresponding to three pixels of each group.

In a seventeenth aspect of the present invention, there is provided a display apparatus further comprising a projection lens for projecting the image of the display portions of the display elements onto a screen, a wall or the like.

In an eighteenth aspect of the present invention, there is provided a projection type display apparatus comprising image display elements, a light source for illuminating the image display elements, at least one first optical element for color-separating the light from the light source into at least two color lights and causing them to impinge upon the image display elements, at least one second optical element for synthesizing the lights output from the image display elements into one, and a lens upon which the light from the at least one second optical element impinges and which projects the image displayed by the image display elements in an enlarged state. A third optical element which transmits visible light of a wavelength shorter than that or vice versa, can be inserted or removed in or from the optical path between the at least one first optical element and the at least one second optical element, and there is provided means for supplying information as to whether the third optical element is in the optical path or not.

In a nineteenth aspect of the present invention, there is provided a projection type display apparatus wherein the means for supplying information as to whether the third optical element is in the optical path or not consists of means for detecting that the third optical element is in the optical path and indicating this by an indicating lamp.

In a twentieth aspect of the present invention, there is provided a projection type display apparatus comprising image display elements, a light source for illuminating the image display elements, a first optical element for color-separating the light from the light source into at least two color lights and causing them to impinge upon the image display elements, a second optical element for synthesizing the lights output from the image display elements into one, and a lens upon which the light from the second optical element impinges and which projects the image displayed by the image display elements in an enlarged state. A third optical element which transmits visible light of a wavelength shorter than that or vice versa, can be inserted or removed in or from the optical path between the first optical element and the second optical element, and there is provided means for changing the cooling condition of the image display elements upon which a larger or smaller quantity of light impinges according to whether the third optical element is in the optical path or not.

In a twenty-first aspect of the present invention, there is provided a projection type display apparatus wherein said means for changing the cooling state consists of a means for detecting the third optical element in the optical path and reducing the air flow rate of the cooling fan as compared to the condition in which the third optical element is not in the optical path.

In a twenty-second aspect of the present invention, there is provided an image processing apparatus comprising a display apparatus and a compute r for inputting image information to said apparatus.

Further objects, features and advantages of the present invention will become apparent from the following description of the preferred embodiments (with reference to the attached drawings).

DESCRIPTION OF THE PREFERRED EMBODIMENT

Figure 1:
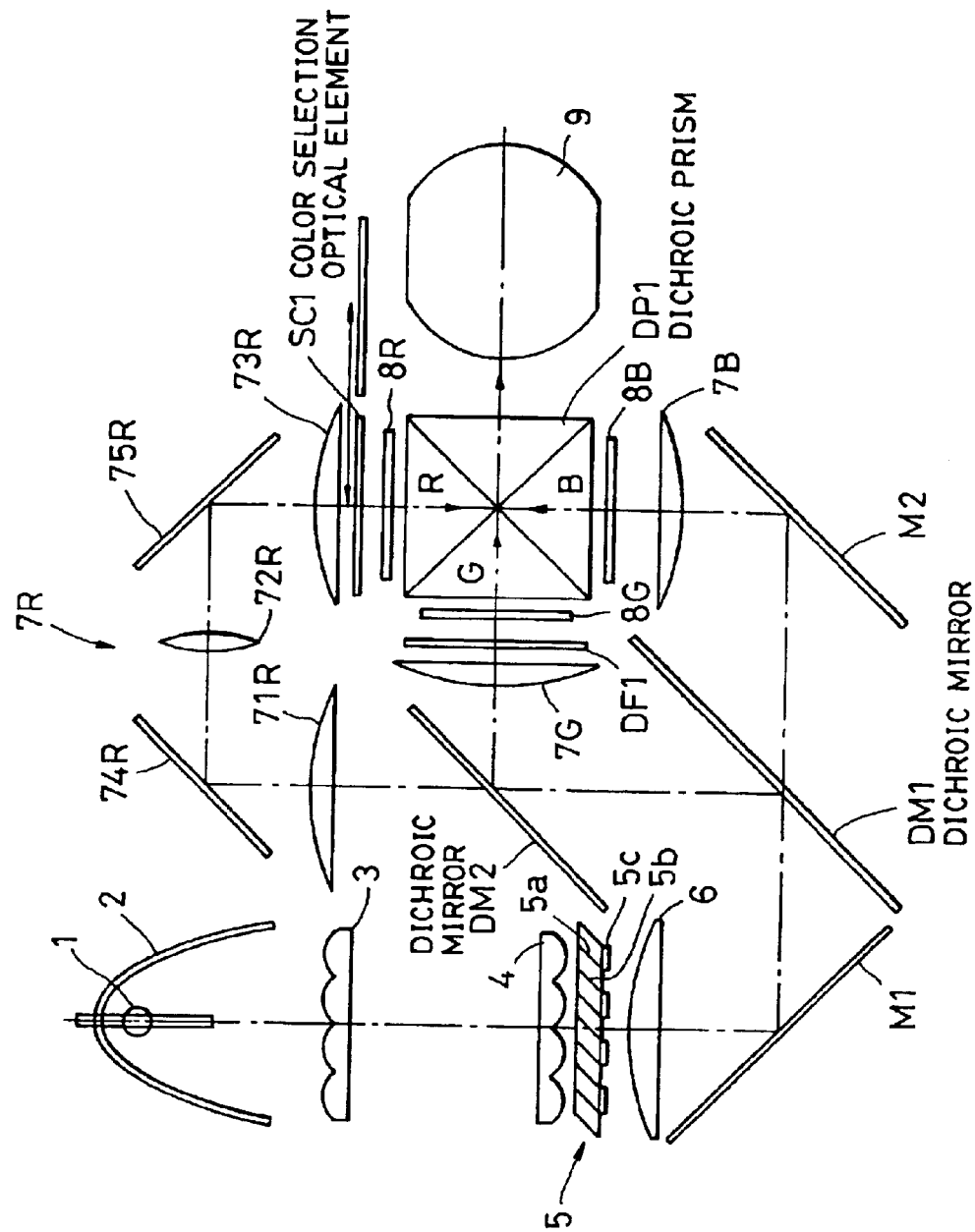
FIG. 1 is a diagram showing an optical arrangement according to an embodiment of the present invention.

FIG. 1 shows the optical arrangement of a projection type display apparatus according to an embodiment of the present invention.

In FIG. 1, numeral 1 indicates a white light source, numeral 2 indicates a reflector, numeral 3 indicates first fly-eye lens (lens array), numeral 4 indicates a second fly-eye lens (lens array), numeral 5 indicates a polarization conversion element provided with a plurality of polarization separation layers 5a, a plurality of reflection surfaces 5b, and a plurality of wavelength plates 5c, and numeral 6 indicates a condenser lens.

Figure 8:
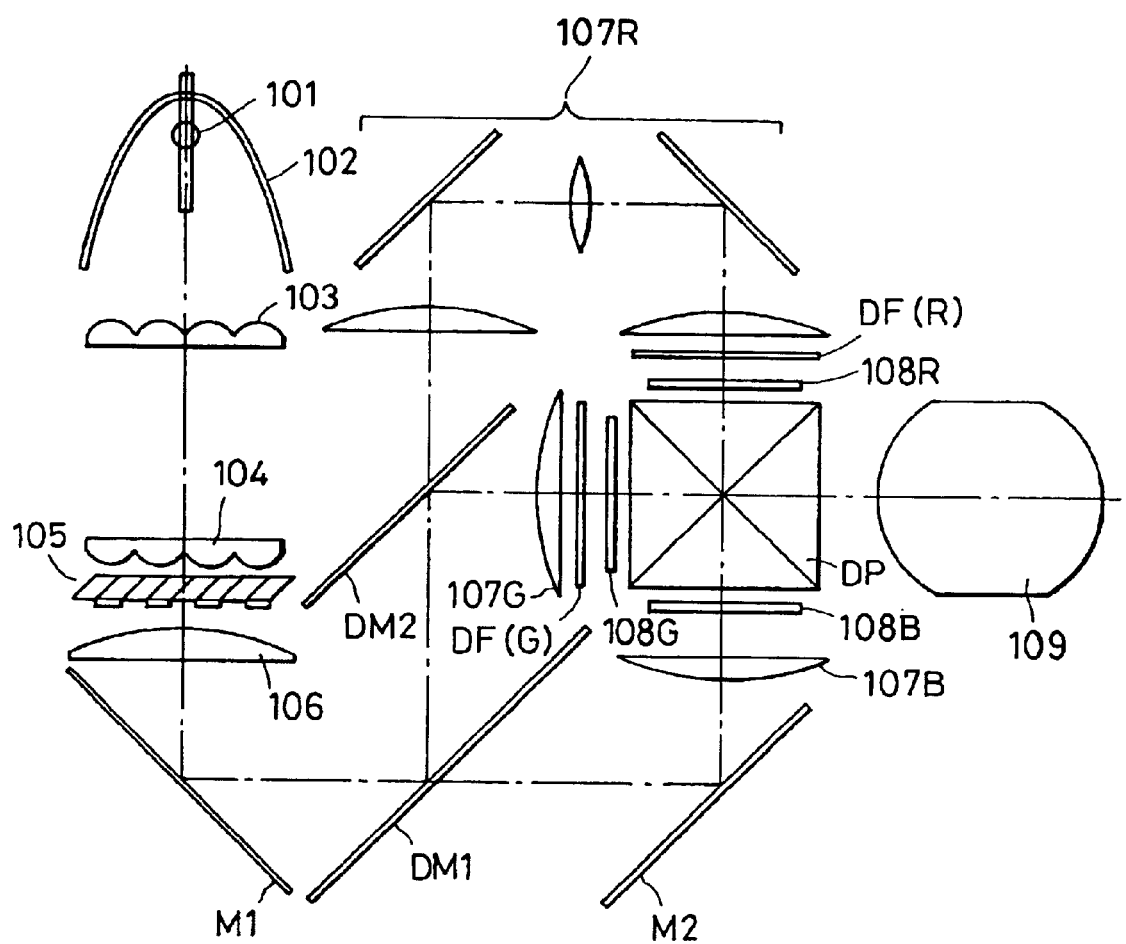
FIG. 8 is a diagram showing a conventional projection type display apparatus.
Figure 9:
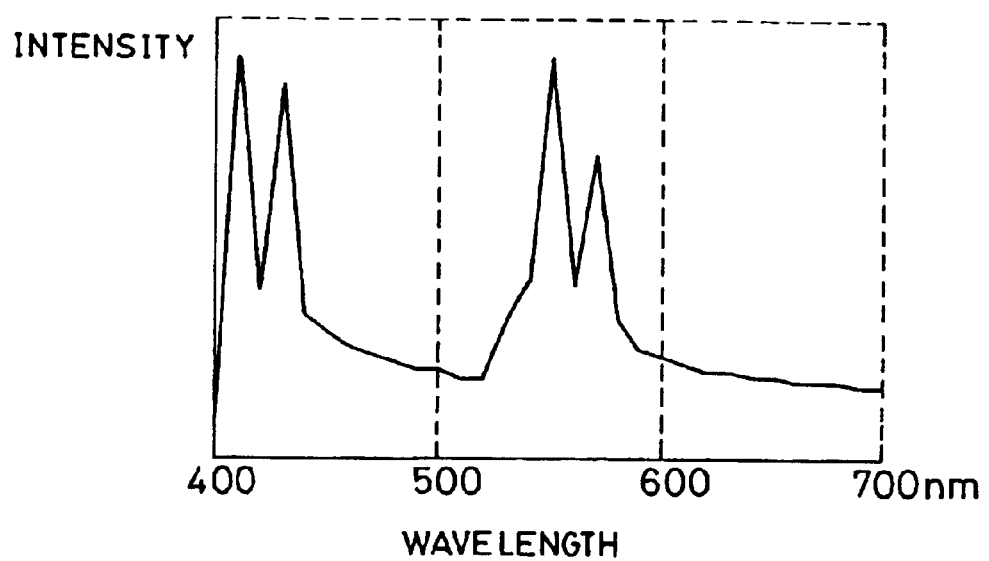
FIG. 9 is a diagram showing the spectral distribution of a light source.
Figure 10:
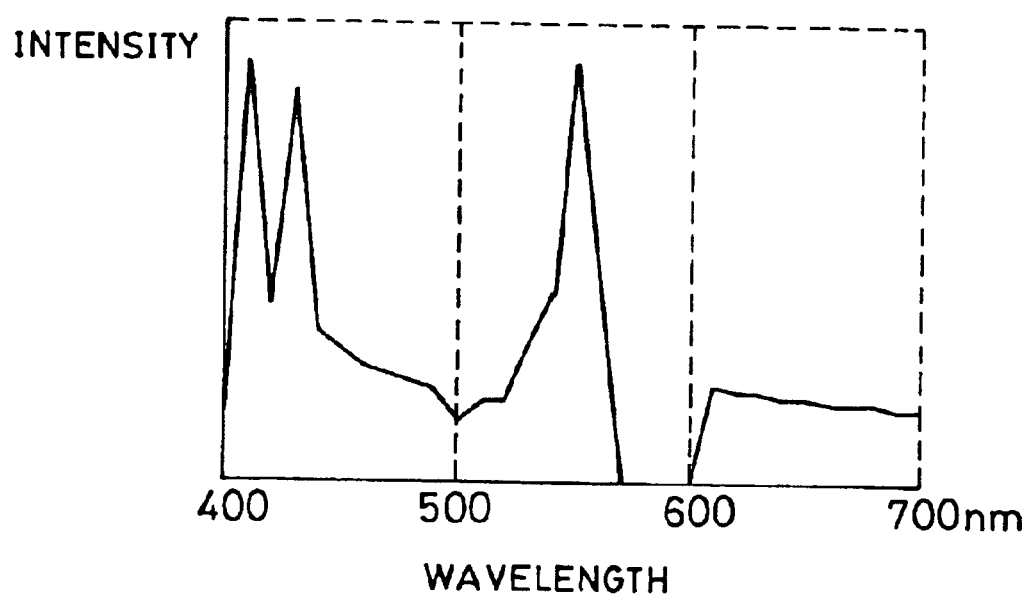
FIG. 10 is a diagram showing a spectral distribution color-synthesized in a projection apparatus.
Figure 11:
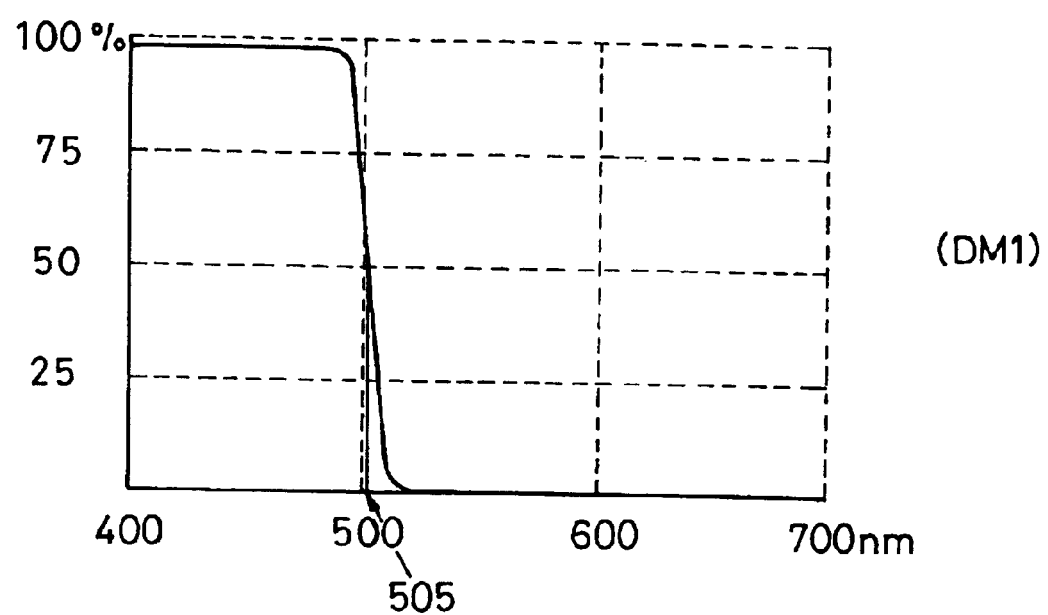
FIG. 11 is a diagram showing the spectral transmittance of an optical element in a projection apparatus.
Figure 12:
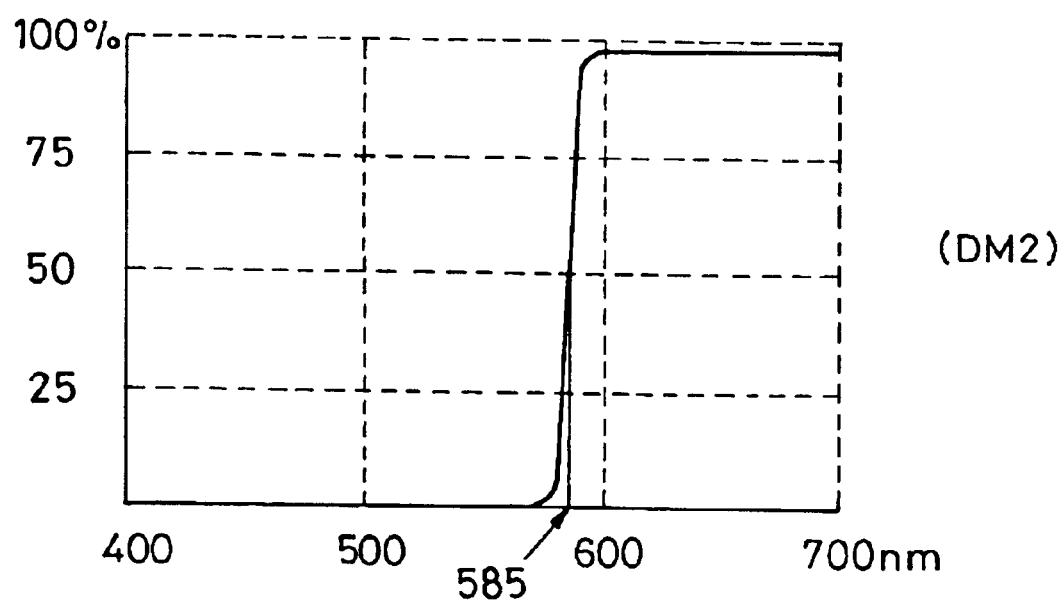
FIG. 12 is a diagram showing the spectral transmittance of an optical element in a projection apparatus.
Figure 13:
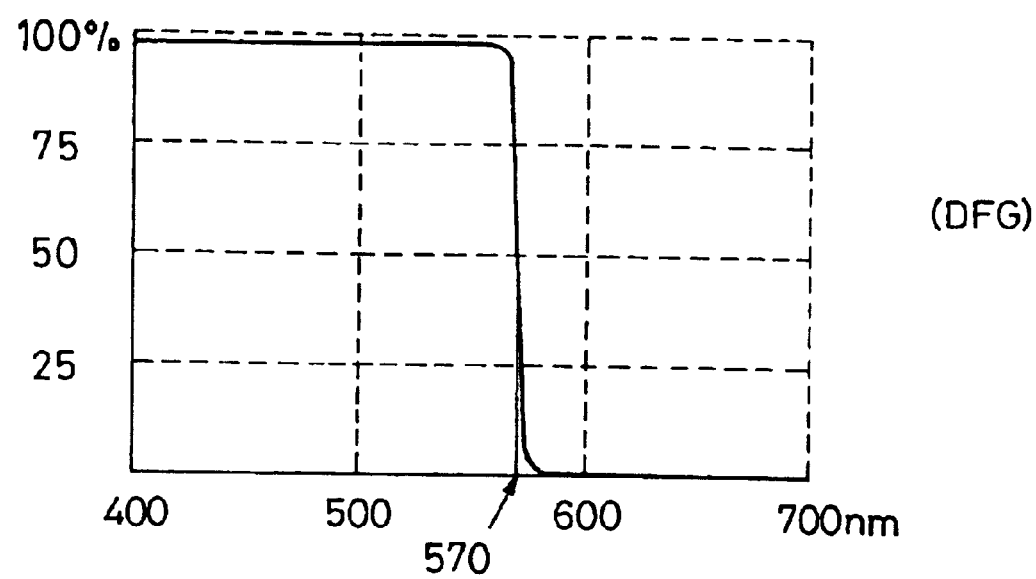
FIG. 13 is a diagram showing the spectral transmittance of an optical element in a projection apparatus.
Figure 14:
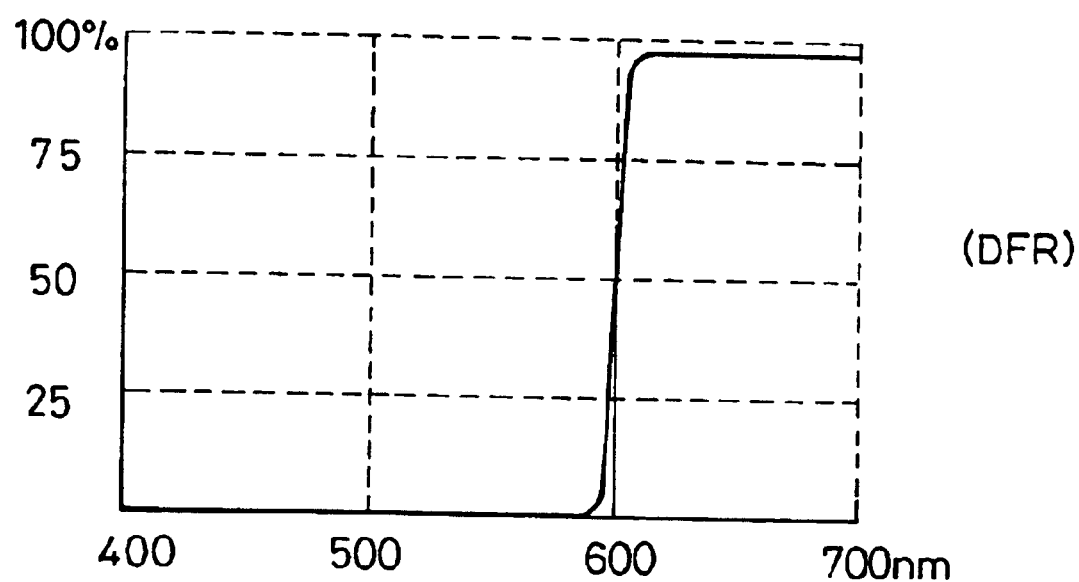
FIG. 14 is a diagram showing the spectral transmittance of an optical element in a projection apparatus.

Numerals DM1 and DM2 indicate dichroic mirrors, numerals M1 and M2 indicate mirrors, and numeral SC1 indicates a wavelength selection element which is a color selection optical element that can be inserted and removed. The wavelength selection characteristic of the element SC1 is the same as that of the dichroic filter DF(R) of FIG. 8. Instead of the element SC1, it is also possible to use the dichroic filter DF(G) of FIG. 8 which is a color selection optical element that can be inserted and removed, or in addition to the element SC1, it is possible to use the dichroic filter DF(G).

Further, this element SC1 is a so-called edge filter which transmits visible light of a wavelength longer than a predetermined wavelength but blocks light of a wavelength shorter than that or which transmits visible light of a wavelength shorter than a predetermined wavelength but blocks light of a wavelength longer than that. In the present invention, it is also possible to use a band pass filter or a band cut filter as the wavelength selection element inserted or removed into or from the optical path of a light of a predetermined color to thereby vary the purity of the predetermined color to vary the quantity of light. Japanese Unexamined Patent Application Publication No. 7-72450 discloses an example in which this kind of wavelength selection element is used to switch between color-purity-emphasized mode and brightness-emphasized mode, and the construction of the optical system of a projection type display apparatus using this type of wavelength selection element can be understood by referring to the abovementioned official gazette, so a detailed description thereof will not be given in the present invention. However, the control methods of the present invention are applicable to the display apparatus disclosed in this official gazette.

In FIG. 1, numeral DF1 indicates a dichroic filter, numerals 7G and 7B indicate condenser lenses, numeral 7R indicates a relay lens system composed of lenses 71R, 72R and 73R and mirrors 74R and 75R, and numerals 8G, 8R and 8B indicate image display elements.

Numeral DP1 indicates a dichroic prism, and numeral 9 indicates a projection lens.

The dichroic mirrors DM1 and DM2 form the abovementioned at least one first optical element, the dichroic prism DP1 form the above-mentioned at least one second optical element, and the color selection optical element SC1 forms the above-mentioned third optical element and wavelength selection element.

The optical operation of this system will be described. White light emitted from the light source 1 is condensed by the reflector 2, passes through the fly-eye lenses 3 and 4, the polarization conversion element 5, and the condenser lens 6, and travels by way of the mirror M1 before it is separated into color lights of R, G and B. The color lights pass mirror M2, the condenser lenses 7G and 7B, and the relay lens system 7R, and are transmitted through the image display elements 8R, 8G and 8B before the color lights of R, G and B are synthesized into one by the dichroic prism DP1, and the image displayed on the image display elements is projected onto a screen (not shown) in an enlarged state by the projection lens 9. The lens system 7R is composed of lenses 71R, 72R and 73R and mirrors 74R and 75R.

Figure 2:
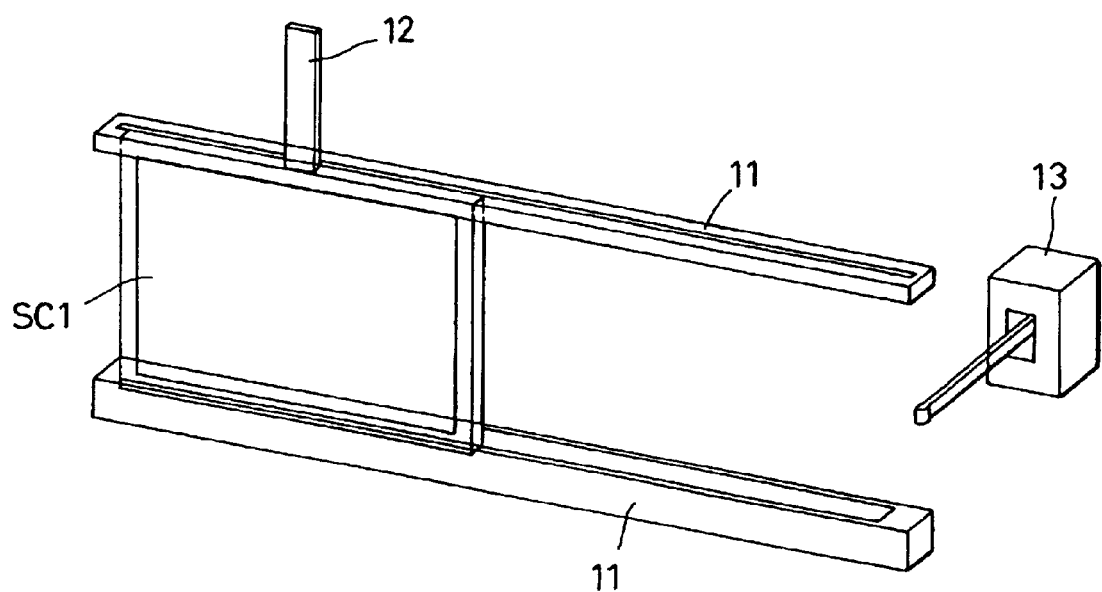
FIG. 2 is a diagram illustrating the color selection element holding structure in the embodiment.

FIG. 2 shows an example of the holding structure for the color selection optical element SC1 of this embodiment. In this example, the color selection optical element SC1 is fastened to a slidable guide 11, and the user slides a knob 12 from outside the apparatus, whereby the color selection optical element SC1 can be inserted or removed into or from the optical path. Further, there is provided a switch 13 to make it possible to detect whether the color selection optical element is in the optical path or not.

As a means for switching between color-purityemphasized mode and brightness-emphasized mode by varying the purity of a predetermined color by the color selection element to vary the quantity of light, it is possible to keep such an optical element in the optical path of a predetermined color and vary the inclination angle thereof with respect to the optical path (optical axis), apart from inserting or removing the optical element in or from the optical path of the predetermined color (not necessarily a dedicated optical path).

Figure 3:
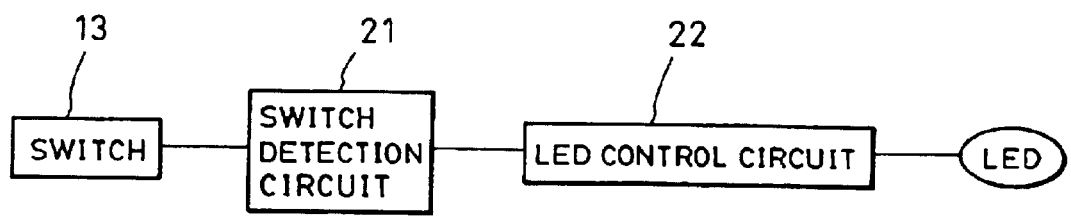
FIG. 3 is a diagram illustrating the LED control portion of the embodiment.

FIG. 3 shows the construction of a control circuit for indicating the projection state of this embodiment to the user.

Numeral 21 indicates a switch detection circuit, which detects a change in the ON/OFF state of the switch 13 to generate a detection signal. Numeral 22 indicates an LED control circuit for controlling the lighting of the LED on the basis of the detection signal from the detection circuit 21.

Figure 4:
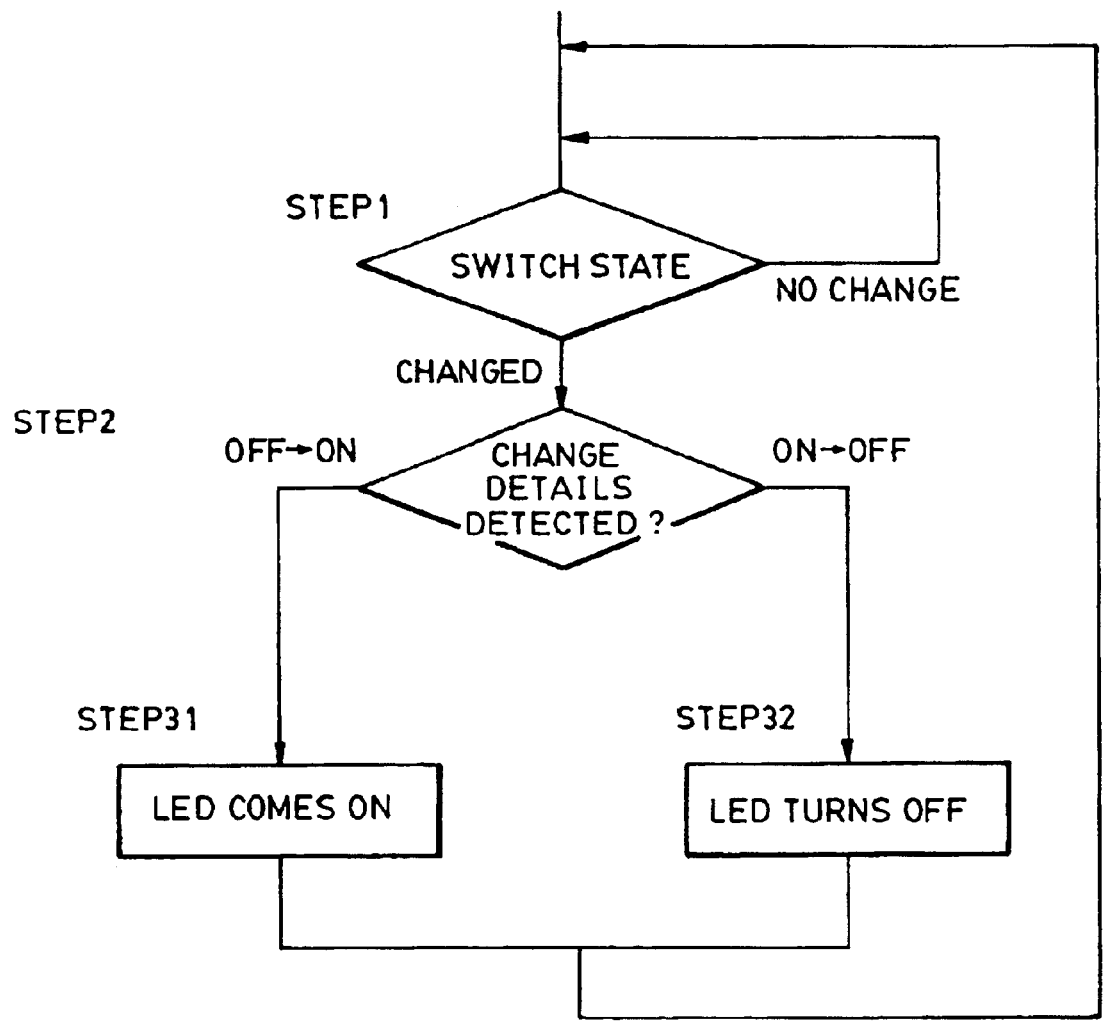
FIG. 4 is a diagram illustrating the operation of the LED control portion of the embodiment.

FIG. 4 is a flowchart illustrating the control flow when, during the use of the projection type display apparatus of this embodiment, the display form is switched between the color-purity-emphasized display mode and the brightness-emphasized display mode by the knob 12.

In Step 1, the detection circuit detects a change in the state of the switch 13, and supplies a detection signal to the LED control circuit when the switch 13 is turned ON or OFF.

When, in Step 2, the state of the switch 13 is changed from OFF to ON, the procedure advances to Step 31, in which the LED comes on, and when the state of the switch 13 is changed from ON to OFF, the procedure advances to Step 32 to turn off the LED.

Figure 15:
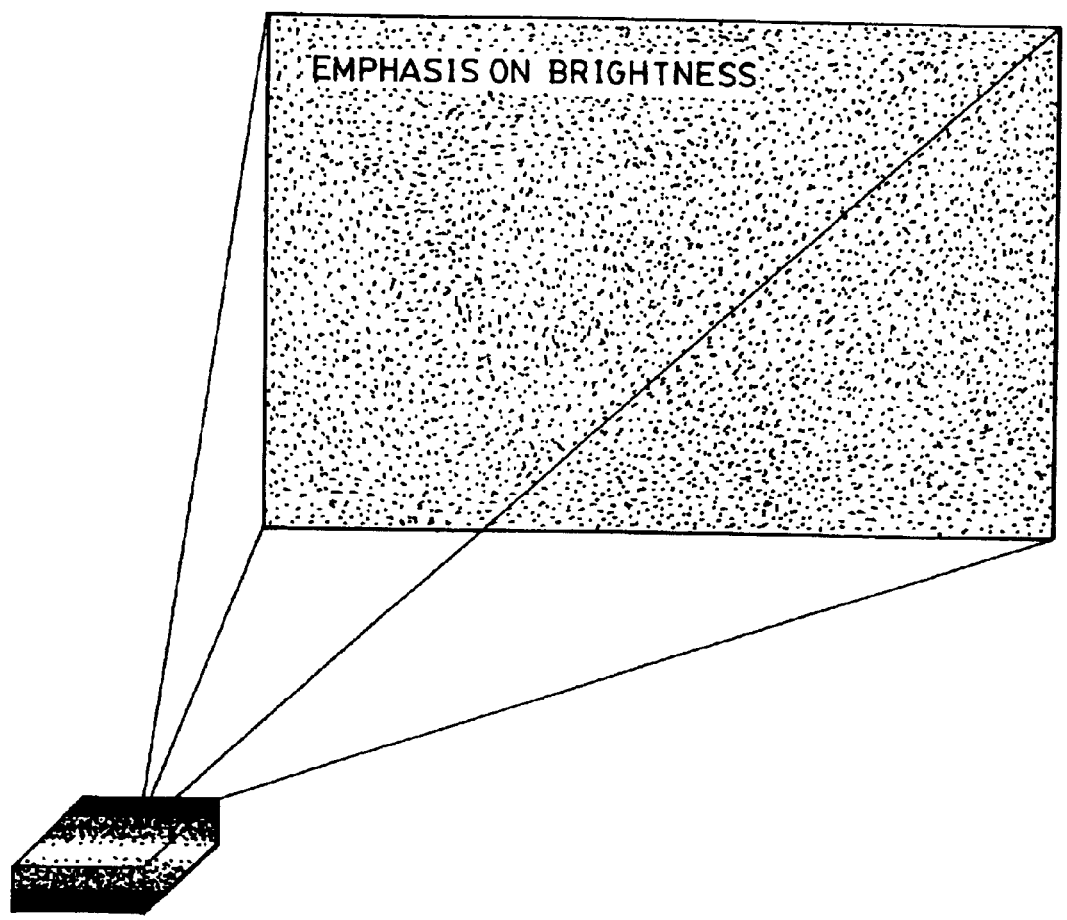
FIG. 15 is a diagram showing a state in which control is effected such that an indication is given on a projection screen to the effect that the apparatus has been switched to a "brightness-emphasized" projection state.

While in the above-described embodiment the LED is lighted as an indication to the user, it is also possible, as shown in FIG. 15, to perform control such that an indication to the effect that the apparatus has been switched to the brightness-emphasized projection state (in FIG. 15, the message "emphasis on brightness") is given on the projection screen or the operating panel (liquid crystal display device) of the apparatus, or a voice message: "The apparatus has been changed to the brightness-emphasized mode", may be given to the user.

Figure 5:
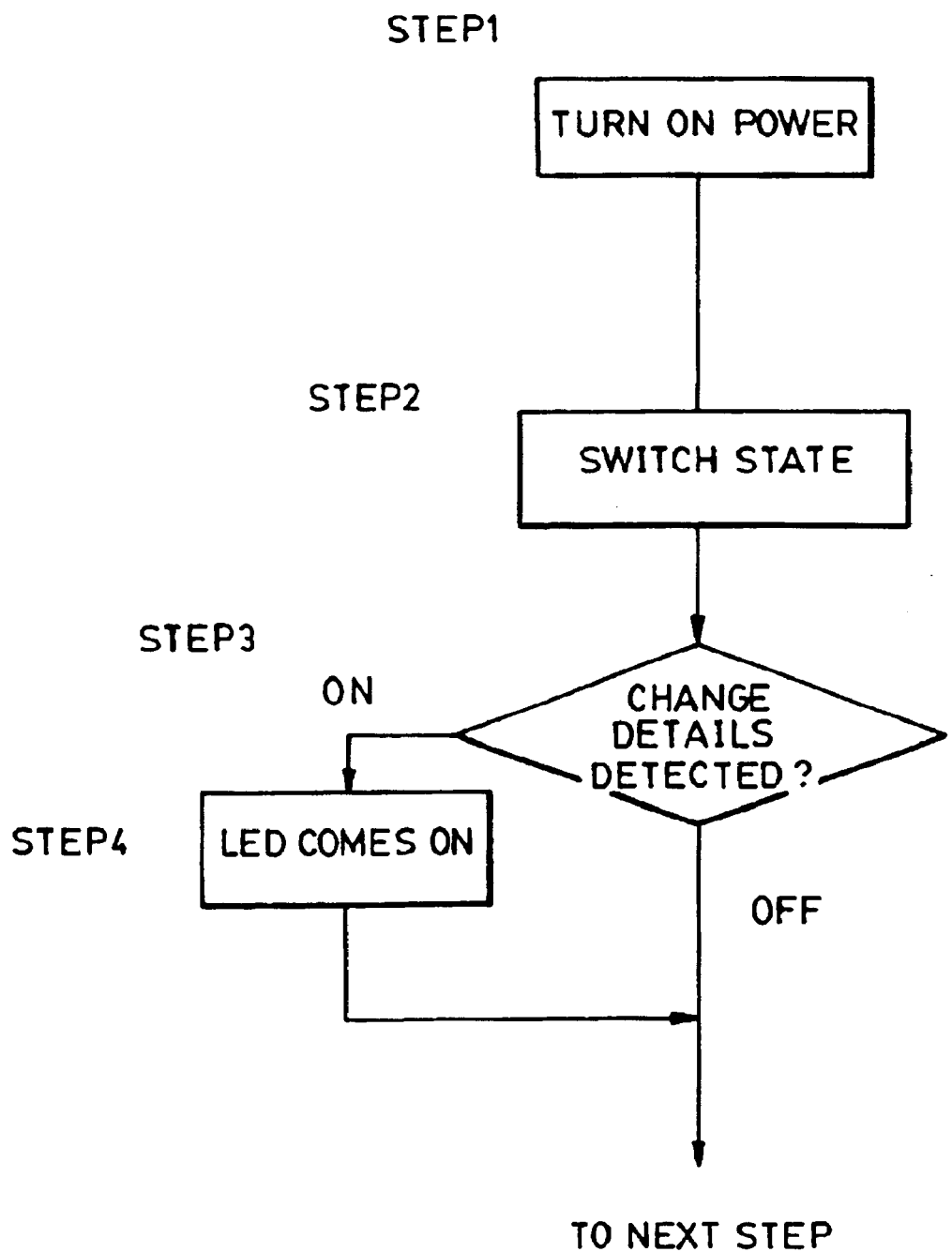
FIG. 5 is a diagram illustrating the control when the power source is turned on in the LED control of the embodiment.

FIG. 5 is a flowchart illustrating the control flow of another form when the power source of the projection type display apparatus of this embodiment is turned on.

When the power source is turned ON in Step 1, the switch detection circuit 21 detects the state of the switch 13 and generates a detection signal in Step 2. When the detection signal is ON in Step 3, the LED is lighted in Step 4. When the detection signal is OFF, the LED is not lighted, and the procedure advances to the control of the state of use shown in FIG. 3.

Figure 6:
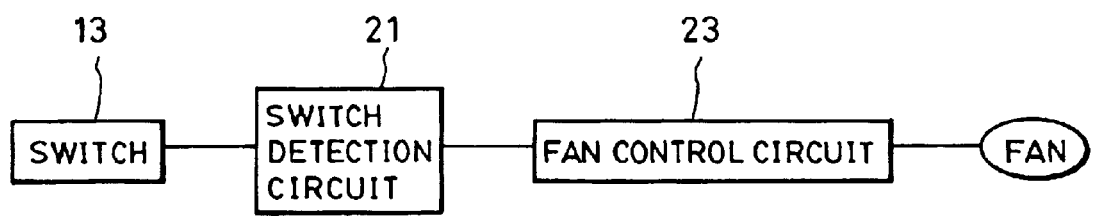
FIG. 6 is a diagram illustrating the FAN control portion of the embodiment.

FIG. 6 is a diagram showing the control system of a cooling fan which is an air cooling means. Numeral 21 indicates a switch detection circuit, which detects a change in the ON/OFF state of the switch 13 to generate a detection signal. Numeral 23 is a fan control circuit, which controls the air flow rate of the fan on the basis of the detection signal from the detection circuit 21.

Figure 7:
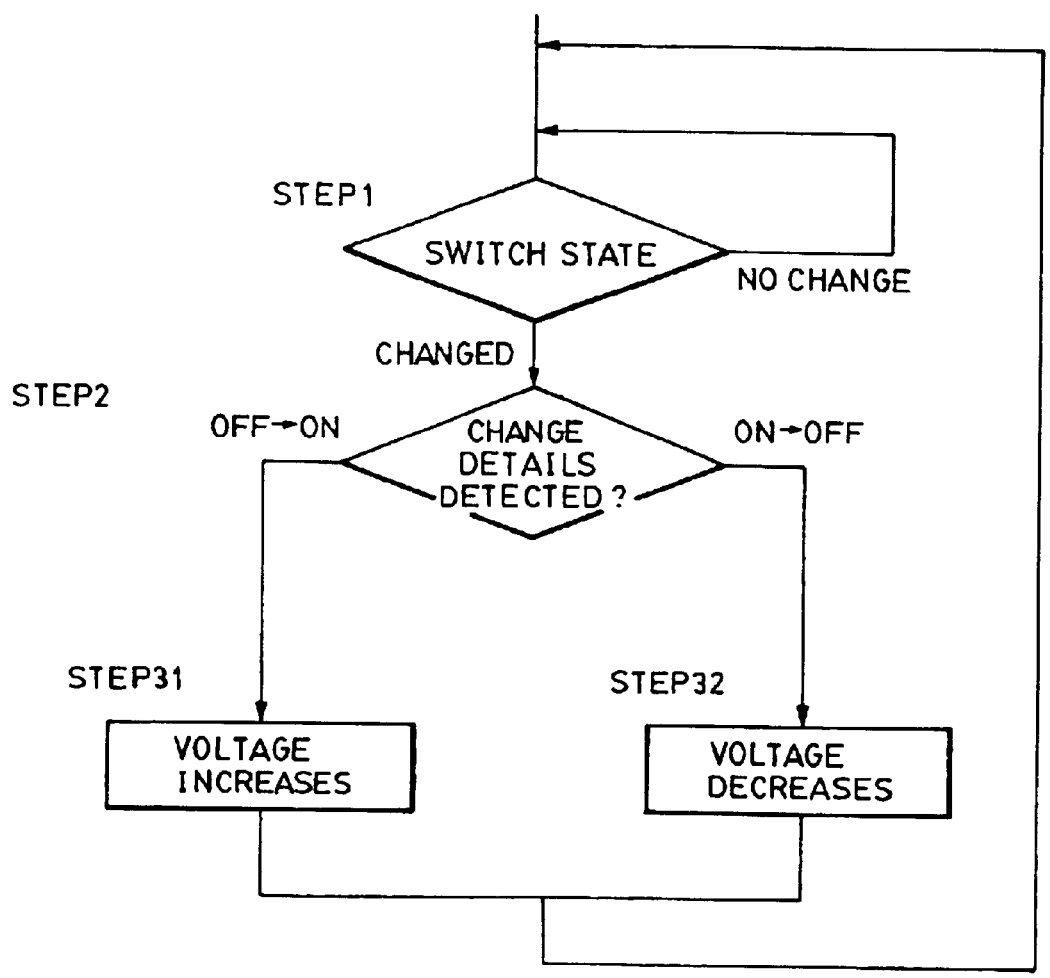
FIG. 7 is a diagram illustrating the operation of the FAN control portion of the embodiment.

FIG. 7 is a flowchart illustrating the control flow when the projection state is switched during the use of the projection apparatus.

In Step 1, the detection circuit detects a change in the state of the switch 13, and supplies a detection signal to the LED control circuit when the switch 13 is turned ON or OFF.

In Step 2, when the state of the switch 13 is changed from OFF to ON, the procedure advances to Step 3, and the voltage applied to the fan is increased so that the speed of the fan may be increased. When the state of the switch is changed from ON to OFF, the procedure advances to Step 32, in which the voltage applied to the fan is reduced so that the speed of the fan may be reduced.

While in this embodiment the air flow rate of the fan is increased or decreased by controlling the speed of the fan, it is also possible to increase or decrease the air flow rate by providing a backup fan, which rotates when the color selection optical element is outside the optical path and does not rotate when the color selection optical element is in the optical path.

While in the above-described embodiment the projection type display apparatus is controlled according to the flows of both FIGS. 4 and 7, it is also possible, in the present invention, to provide two different projection display apparatuses that are controlled by the flow of either FIG. 4 or FIG. 7.

Further, while in the projection type display apparatus of this embodiment an air cooling means is used as the means for cooling the image display elements, it is also possible to use a water cooling means for cooling the image display elements by a water cooling system, with the flow of the cooling fluid being varied according to whether the color selection optical element is in the optical path or not (The flow rate is increased when the color selection optical element is in the optical path, and decreased when it is not).

Further, while the image display apparatus of the above-described embodiment is a so-called three-plate type color image display apparatus using three image display elements, there is no limitation to the number of image display elements in the present invention. For example, the present invention is also applicable to a projection type display apparatus using a single color image display element. A form of this sort of projection type display apparatus has a micro lens array on the incident side, using image display elements (usually, liquid crystal panels) of the type which condense lights of R, G and B on pixel groups corresponding to the primaries of R, G and B by the micro lens array, a color separation optical system, a projection lens and other optical systems but using no color synthesis optical system. The optical systems of such projection type display apparatuses are disclosed, for example, in Japanese Unexamined Patent Application Publications No. 3-56922 and 4-60538. By referring to these official gazettes and the above embodiment, the present invention can be easily applied to such projection type display apparatuses.

Further, in the present invention, the form of the image display element is not restricted to a liquid crystal display device. It is also possible to adopt a form using a display element based on some other optical modulation principle.

Further, the present invention is not restricted to the front side projection type display apparatus shown in the drawings. The present invention is also applicable to a direct view type or a back side projection type display apparatus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A display apparatus of the type which forms an image by modulating light by one or more display elements, said display apparatus comprising:

cooling means for cooling the one or more display elements; and means for varying the quantity of light impinging on the one or more display elements, wherein a cooling capacity of said cooling means with respect to the one or more display elements is varied according to a variation in the quantity of light.

2. A display apparatus of the type which forms a color image by modulating a plurality of lights, different from each other in color, by one or more display elements, said display apparatus comprising:

cooling means for cooling the one or more display elements; and means for obtaining a plurality of display forms by changing the color purity of at least one light of the plurality of lights, wherein a cooling capacity of said cooling means is varied with respect to the one or more display elements modulating the at least one light according to a variation in the color purity of the at least one light.

3. A display apparatus of the type which forms a color image by modulating a plurality of lights, different from each other in color, by one or more display elements, said display apparatus comprising:

cooling means for cooling the one or more display elements; and means for varying the color purity of at least one light of the plurality of lights by inserting or removing a wavelength selection element into or from the optical path of the at least one light or varying the attitude of said wavelength selection element, wherein a cooling capacity of said cooling means with respect to the one or more display elements modulating the at least one light is varied according to whether said wavelength selection element is in the optical path of the at least one light or according to a variation in the attitude of said wavelength selection element in the optical path of the at least one light.

4. A display apparatus according to one of claims 1, 2 and 3, wherein said cooling means is an air cooling type cooling means, wherein the variation in the cooling capacity is a variation in an air flow rate with respect to the one or more display elements.

5. A display apparatus according to one of claims 1, 2, and 3, wherein said cooling means is a water cooling type cooling means, wherein the variation in the cooling capacity is a variation in a water flow rate with respect to the one or more display elements.

6. A display apparatus of the type which forms a color image by modulating a plurality of lights, different from each other in color, by one or more display elements, said display apparatus comprising:

air cooling means for air cooling the one or more display elements;

means for varying the color purity of at least one light of the plurality of lights by inserting or removing a wavelength selection element into or from the optical path of the at least one light or varying the attitude of said wavelength selection element; and means for supplying information on the position or the attitude of said wavelength selection element with respect to the optical path of the at least one light, wherein an air flow rate of said air-cooling means is varied with respect to the one or more display elements modulating the at least one light according to whether said wavelength selection element is in the optical path of the at least one light or according to the attitude of said wavelength selection element in the optical path of the at least one light.

7. A display apparatus of the type which forms a color image by modulating a plurality of lights, different from each other in color, by one or more display elements, said display apparatus comprising:

means for changing the color purity of at least one light of the plurality of lights by inserting or extracting a wavelength selection element into or out of the optical path of the at least one light or changing the attitude of said wavelength selection element; and means for supplying information as to whether said wavelength selection element is in the optical path of the at least one light or information on the attitude of said wavelength selection element in the optical path of the at least one light, wherein said means for supplying information is provided with means for (i) detecting that said wavelength selection element is in the optical path of the at least one light or that said wavelength selection element is in a predetermined attitude and (ii) for lighting a lamp.

8. A display apparatus of the type which forms a color image by modulating a plurality of lights, different from each other in color, by one or more display elements, said display apparatus comprising:

means for changing the color purity of at least one light of the plurality of lights by inserting or extracting a wavelength selection element into or out of the optical path of the at least one light or changing the attitude of said wavelength selection element; and means for supplying information as to whether said wavelength selection element is in the optical path of the at least one light or information on the attitude of said wavelength selection element in the optical path of the at least one light, wherein the wavelength selection element is an element which transmits visible light of a wavelength longer than a predetermined wavelength and blocks visible light of a wavelength shorter than that or an element which transmits visible light of a wavelength shorter than a predetermined wavelength and blocks visible light of a wavelength longer than that.

9. A display apparatus of the type which forms a color image by modulating a plurality of lights, different from each other in color, by one or more display elements, said display apparatus comprising:

means for changing the color purity of at least one light of the plurality of lights by inserting or extracting a wavelength selection element into or out of the optical path of the at least one light or changing the attitude of said wavelength selection element; and means for supplying information as to whether said wavelength selection element is in the optical path of the at least one light or information on the attitude of said wavelength selection element in the optical path of the at least one light, wherein the wavelength selection element is an edge filter, a band pass filter or a band cut filter.

10. A display apparatus of the type which forms a color image by modulating a plurality of lights, different from each other in color, by one or more display elements, said display apparatus comprising:

means for changing the color purity of at least one light of the plurality of lights by inserting or extracting a wavelength selection element into or out of the optical path of the at least one light or changing the attitude of said wavelength selection element; and means for supplying information as to whether said wavelength selection element is in the optical path of the at least one light or information on the attitude of said wavelength selection element in the optical path of the at least one light.

further comprising a plurality of dichroic mirrors for separating white light from a light source into the plurality of lights of different colors, wherein the plurality of lights of different colors consists of red, green and blue lights.

11. A display apparatus according to claim 10, wherein the display elements are arranged in correspondence with the red, green and blue lights, and wherein there are provided a plurality of dichroic mirrors for synthesizing image light from a plurality of display elements modulating the red, green and blue lights.

12. A display apparatus according to claim 10, wherein the one or more display elements include three pixel groups, respectively corresponding to the red, green and blue lights, and a micro lens arrays condensing lights of the colors corresponding to the three pixels of each group.

13. A display apparatus of the type which forms a color image by modulating a plurality of lights, different from each other in color, by one or more display elements, said display apparatus comprising:

means for changing the color purity of at least one light of the plurality of lights by inserting or extracting a wavelength selection element into or out of the optical path of the at least one light or changing the attitude of said wavelength selection element; and means for supplying information as to whether said wavelength selection element is in the optical path of the at least one light or information on the attitude of said wavelength selection element in the optical path of the at least one light, further comprising a projection lens for projecting the image of display portions of the one or more display elements onto a screen or a wall.

14. A projection type display apparatus comprising:

image display elements;

a light source for illuminating said image display elements;

at least one first optical element for color-separating the light from said light source into at least two color lights and causing them to impinge upon said image display elements;

at least one second optical element for synthesizing the lights output from said image display elements into one; and a lens upon which the light from said at least one second optical element impinges and which projects the image displayed by said image display elements in an enlarged state, wherein a third optical element which transmits visible light of a wavelength longer than a predetermined wavelength and blocks visible light of a wavelength shorter than that or vice versa, can be inserted into or removed from the optical path between said at least one first optical element and said at least one second optical element, and wherein there is provided means for supplying information as to whether said third optical element is in the optical path.

15. A projection type display apparatus according to claim 14, wherein said means for supplying information as to whether said third optical element is in the optical path consists of means for detecting that said third optical element is in the optical path and indicating this by an indicating lamp.

16. A projection type display apparatus comprising:

image display elements;

a light source for illuminating the image display elements;

a first optical element for color-separating the light from said light source into at least two color lights and causing them to impinge upon said image display elements;

a second optical element for synthesizing the lights output from said image display elements into one; and a lens upon which the light from said second optical element impinges and which projects the image displayed by said image display elements in an enlarged state, wherein a third optical element which transmits visible light of a wavelength longer than a predetermined wavelength and blocks visible light of a wavelength shorter than that or vice versa, can be inserted into or removed from the optical path between said first optical element and said second optical element, and wherein there is provided means for changing a cooling condition of said image display elements upon which a larger or smaller quantity of light impinges according to whether said third optical element is in the optical path.

17. A projection type display apparatus according to claim 16, wherein said means for changing the cooling condition comprises means for detecting if said third optical element is in the optical path and reducing an air flow rate of the cooling fan as compared to a condition in which said third optical element is not in the optical path.

18. An image processing apparatus comprising a display apparatus as claimed in one of claims 1, 2, 3, 6, 7, 8, 9, 10, 13, 14, and 16 and a computer for inputting image information to said display apparatus.

* * * * *

UNITED STATES PATENT AND TRADEMARK OFFICE
CERTIFICATE OF CORRECTION

PATENT NO. : 6,783,244 B1
DATED : August 31, 2004
INVENTOR(S) : Atsushi Okuyama et al.

It is certified that error appears in the above-identified patent and that said Letters Patent is hereby corrected as shown below:

Column 4,
Line 46, "alight" should read -- a light --.

Column 5,
Line 29, "and a compute r" should read -- as claimed in one of claims 1 through 21 and a computer --.

Column 7,
Line 22, "purityemphasized" should read -- purity-emphasized --.

Column 11,
Line 31, "light." should read -- light, --.

Signed and Sealed this

Twenty-fifth Day of January, 2005

JON W. DUDAS
*Director of the United States Patent and Trademark Office*